(12) United States Patent
Ohsawa

(10) Patent No.: US 6,309,075 B1
(45) Date of Patent: Oct. 30, 2001

(54) IMAGE DISPLAY APPARATUS

(75) Inventor: Toshifumi Ohsawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/184,243

(22) Filed: Nov. 2, 1998

(30) Foreign Application Priority Data

Nov. 11, 1997 (JP) .................................................. 9-308860

(51) Int. Cl.[7] .................................................. G03B 21/00
(52) U.S. Cl. .............................................. 353/122; 349/25
(58) Field of Search .......................... 353/122, 25, 26 R, 353/26 A, 27 A, 27 R, 74; 349/25, 27, 28

(56) References Cited

U.S. PATENT DOCUMENTS

| | | | |
|---|---|---|---|
| 5,325,137 | * | 6/1994 | Konno et al. ............................ 353/63 |
| 5,546,128 | * | 8/1996 | Nakagakiuchi et al. .............. 348/362 |
| 5,829,855 | * | 11/1998 | Uchiyama ................................ 353/74 |
| 6,040,880 | * | 3/2000 | Tsuboi et al. ............................. 349/5 |
| 6,164,780 | * | 12/2000 | Noto et al. ............................ 353/122 |
| 6,222,609 | * | 4/2001 | Ohsawa et al. ......................... 345/32 |

* cited by examiner

*Primary Examiner*—William Dowling
(74) *Attorney, Agent, or Firm*—Fitzpatrick, Cella, Harper & Scinto

(57) ABSTRACT

An image display apparatus having a storage display device which stores an image written by writing light representative of the image and displays the stored image, includes a density detecting device for detecting a density of the storage display device and a control device which brings image writing to an end when the density detected by the density detecting device reaches a predetermined density after the image writing to the storage display device is started.

18 Claims, 14 Drawing Sheets

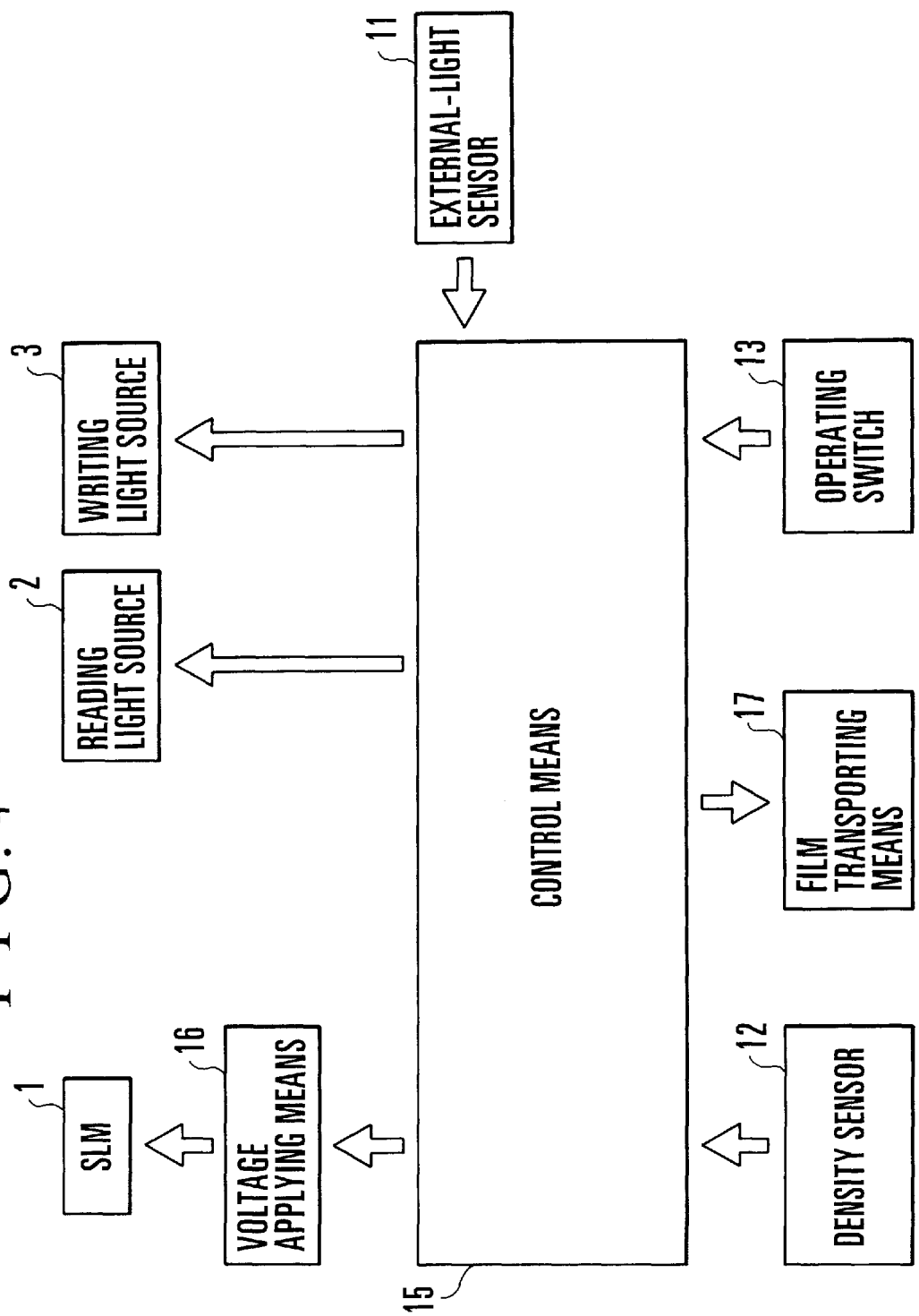

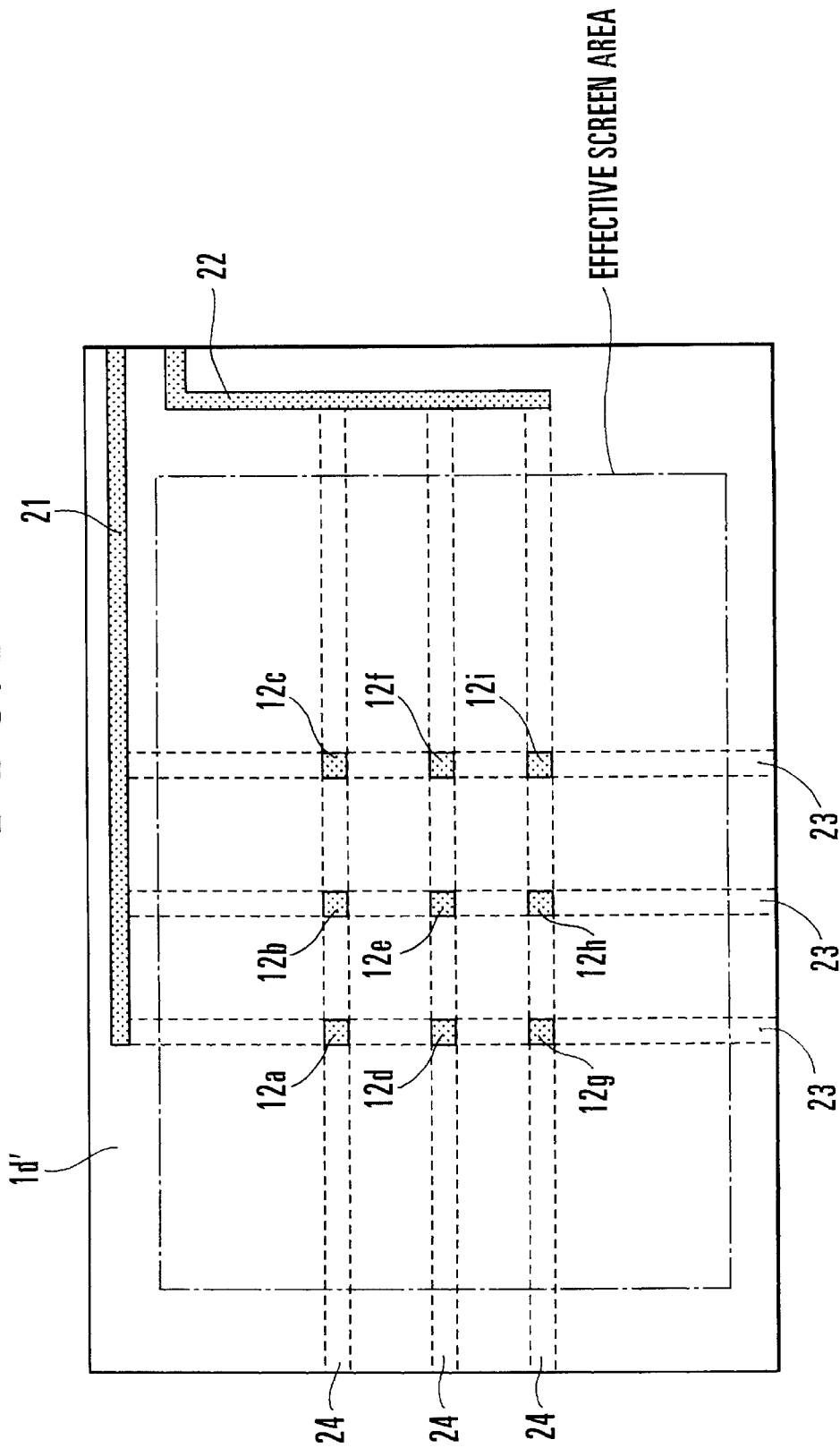

IMAGE DISPLAY APPARATUS

BACKGROUND OF THE INVENTION

1. Field of the Invention

The present invention relates to an image display apparatus capable of displaying an image recorded on an image recording medium.

2. Description of Related Art

It has heretofore been proposed to provide an image display apparatus arranged to write a negative image or a positive image recorded on a photographic film or the like to a spatial light modulator (hereinafter referred to as SLM) and read the recorded negative or positive image from the spatial light modulator so that a user can view the recorded negative or positive image. For example, there is an apparatus which is arranged to write a negative image to an SLM by the projection of writing light from an image recorded on a negative film, thereby allowing a user to view the written image as a positive image.

In such an apparatus, if an image recorded on a negative film or the like is to be written to the SLM, it is desirable to adjust the density of writing light in conformity with the range of reproduction of the tone of an image to be read from the SLM. If an image is written to the SLM so as not to conform with the range of reproduction of the tone of an image to be read from the SLM, the image will lose gradation in its bright or dark portion or the original color of the image will not be reproduced during reading, so that a user will be forced to view an image which is visually extremely impaired.

However, the density of an image to be written, which is recorded on a film, depends on the color or the brightness of a photographed subject, an error in the accuracy of exposure during photography or the conditions of illumination of the subject (for example, front light or back light), and even if writing of the image to the SLM is performed under fixed conditions, it is considerably difficult to conform the tone of the image written to the SLM with the range of reproduction of the tone of an image to be read from the SLM. In addition, individual SLMs exhibit different sensitivities even if the SLMs are of the same type, so that as long as the same image is written under the same conditions, a particular SLM may fail to correctly write the image which could be correctly written by another SLM. Furthermore, since the sensitivity of an SLM also tends to depend on environmental conditions such as temperature, it is difficult to write a correct image under any environmental condition by means of such SLM.

BRIEF SUMMARY OF THE INVENTION

One aspect of the present invention is to provide an image display apparatus having a storage display device which stores an image written by writing light representative of the image and displays the stored image, the image display apparatus including density detecting means for detecting a density of the storage display device (a density of the stored image), and being arranged to bring image writing to an end when the density detected by the density detecting means reaches a predetermined density after the image writing to the storage display device is started.

The above and other aspects of the present invention will become apparent from the following detailed description of preferred embodiments of the present invention, taken in conjunction with the accompanying drawings.

BRIEF DESCRIPTION OF THE DRAWINGS

FIG. 4 is a block diagram showing the electrical circuit construction of the image display apparatus according to the first embodiment;

FIG. 14 is a schematic view of the layout of density sensors which are formed on a glass in an SLM of a display apparatus according to a fifth embodiment of the present invention.

DETAILED DESCRIPTION OF THE INVENTION

Preferred embodiments of the present invention will be described below in detail with reference to the accompanying drawings.

First Embodiment

FIGS. 1, 2, 3A and 3B show a display apparatus (image display apparatus) according to a first embodiment of the present invention. First of all, the construction and the operation principle of a spatial light modulator (SLM) 1 which is used in the display apparatus will be described below with reference to FIGS. 1 and 2.

Figure 1:
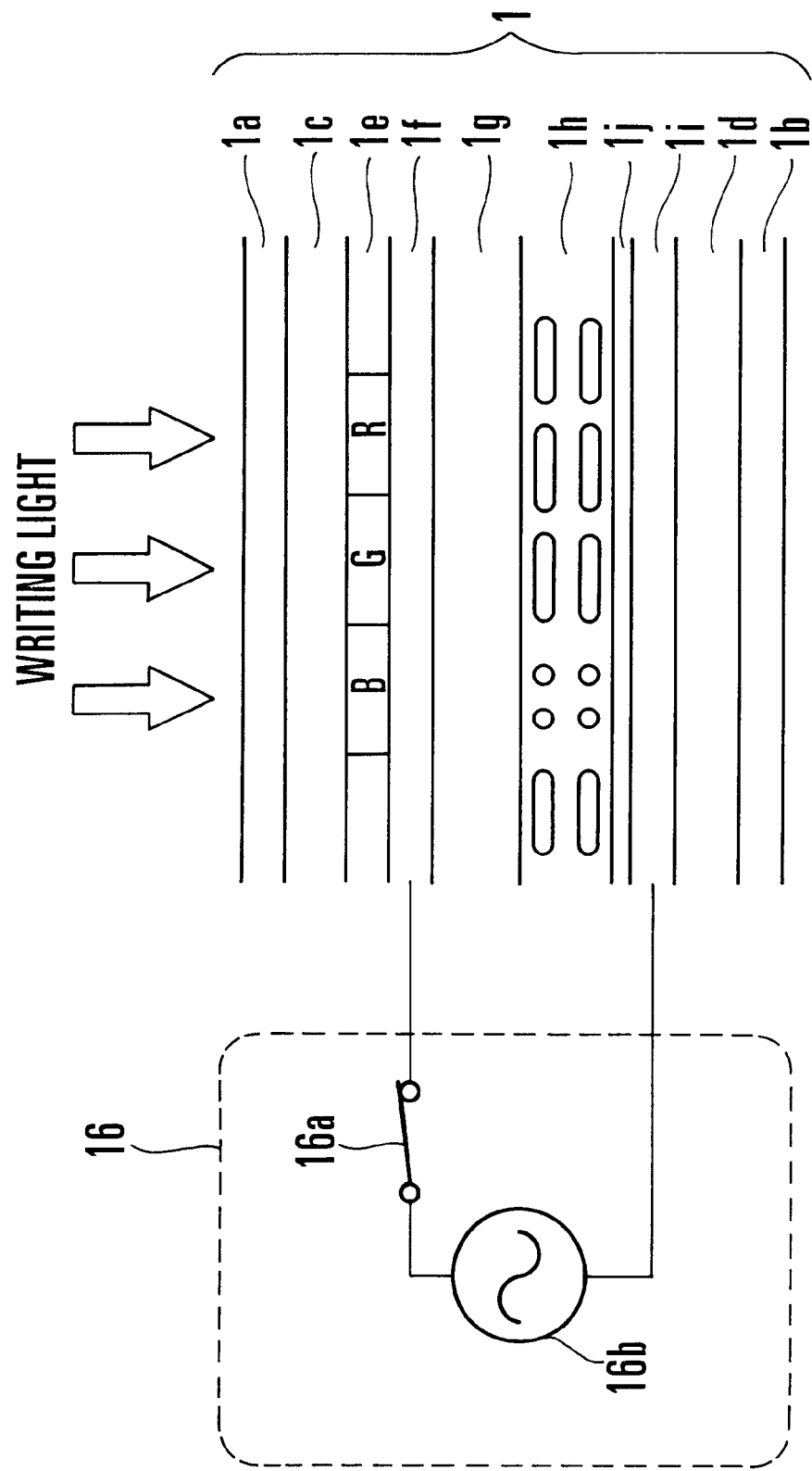
FIG. 1 is a diagrammatic cross-sectional view aiding in describing the construction and the operation principle of a spatial light modulator (SLM) used in an image display apparatus according to a first embodiment of the present invention.

As shown in FIG. 1, the SLM 1 includes a polarizer 1a, a glass 1c, a color filter 1e of pure colors or complementary colors, an ITO (indium tin oxide) layer which constitutes a transparent electrode 1f, a photoconductor layer 1g made from an amorphous film, an organic semiconductor film or the like, a liquid crystal layer 1h made of a ferroelectric liquid crystal (FLC) or the like, an alignment film 1j, an ITO layer which constitutes another transparent electrode 1*i*, a glass 1*d*, and a polarizer 1*b*. These layers 1*a*, 1*c*, 1*e*, 1*f*, 1*g*, 1*h*, 1*j*, 1*i*, 1*d* and 1*b* are stacked one on another in such a manner that the layers 1*e*, 1*f*, 1*g*, 1*h*, 1*j* and 1*i* are sandwiched between the layers 1*a* and 1*c* and the layers 1*d* and 1*b*.

The polarizers 1*a* and 1*b* are of a crossed Nicols type in which their polarization directions are perpendicular to each other. The liquid crystal layer 1*h* is sufficiently reduced in layer thickness, and the longitudinal axes of its liquid crystal molecules are oriented to be tilted by a predetermined angle with respect to its layer surfaces by the action of the alignment film 1*j*. It is known that this angle is varied by the application of an electric field and is held even after the application of the electric field is stopped. The SLM 1 may be of another type in which its polarizers have arbitrarily selected polarization directions and its liquid crystal molecules have an arbitrarily selected orientation angle. For example, the SLM 1 may be of a type which is non-transmissive before an application of an electric field but becomes transmissive after the application of an electric field, or of a type which is transmissive before an application of an electric field but becomes non-transmissive after the application of an electric field. The former type is suited to the case in which a user views a so-called positive image on an as-is basis, i.e., as a positive image, whereas the latter type is suited to the case in which a user views a so-called negative image as a reversed positive image.

Voltage applying means 16 which includes a switch 16*a* and a power source 16*b* is connected to the transparent electrodes 1*f* and 1*i*.

As shown in FIG. 1, when writing light having image information is made incident on the back surface (in FIG. 1, the upper surface; hereinafter referred to as the light illumination surface) of the SLM 1 with the switch 16*a* being turned on to apply a predetermined voltage across both transparent electrodes 1*f* and 1*i*, the writing light is transmitted through the polarizer 1*a* and the glass 1*c* and enters the color filter 1*e*. After having been subjected to color separation in the color filter 1*e*, the writing light is transmitted through the transparent electrode if and enters the photoconductor layer 1*g*. In the photoconductor layer 1*g*, its electrical resistance becomes relatively lower in a portion exposed to a larger light intensity, so that, in the liquid crystal layer 1*h*, a relatively larger electric field is applied to a portion exposed to a larger light intensity and the orientation angle of the liquid crystal molecules is varied. Accordingly, the orientation angle of the liquid crystal molecules of the liquid crystal layer 1*h* is determined in accordance with the image information, i.e., the color information and the light intensity of the writing light, whereby the image is written to the SLM 1.

Then, when the switch 16*a* is turned off to stop the application of the voltage across both transparent electrodes 1*f* and 1*i*, the writing operation is completed. Incidentally, a feature of the ferroelectric liquid crystal (FLC) is that even if the application of the voltage across both transparent electrodes 1*f* and 1*i* is stopped, the orientation angle of the liquid crystal molecules is memorized.

Figure 2:
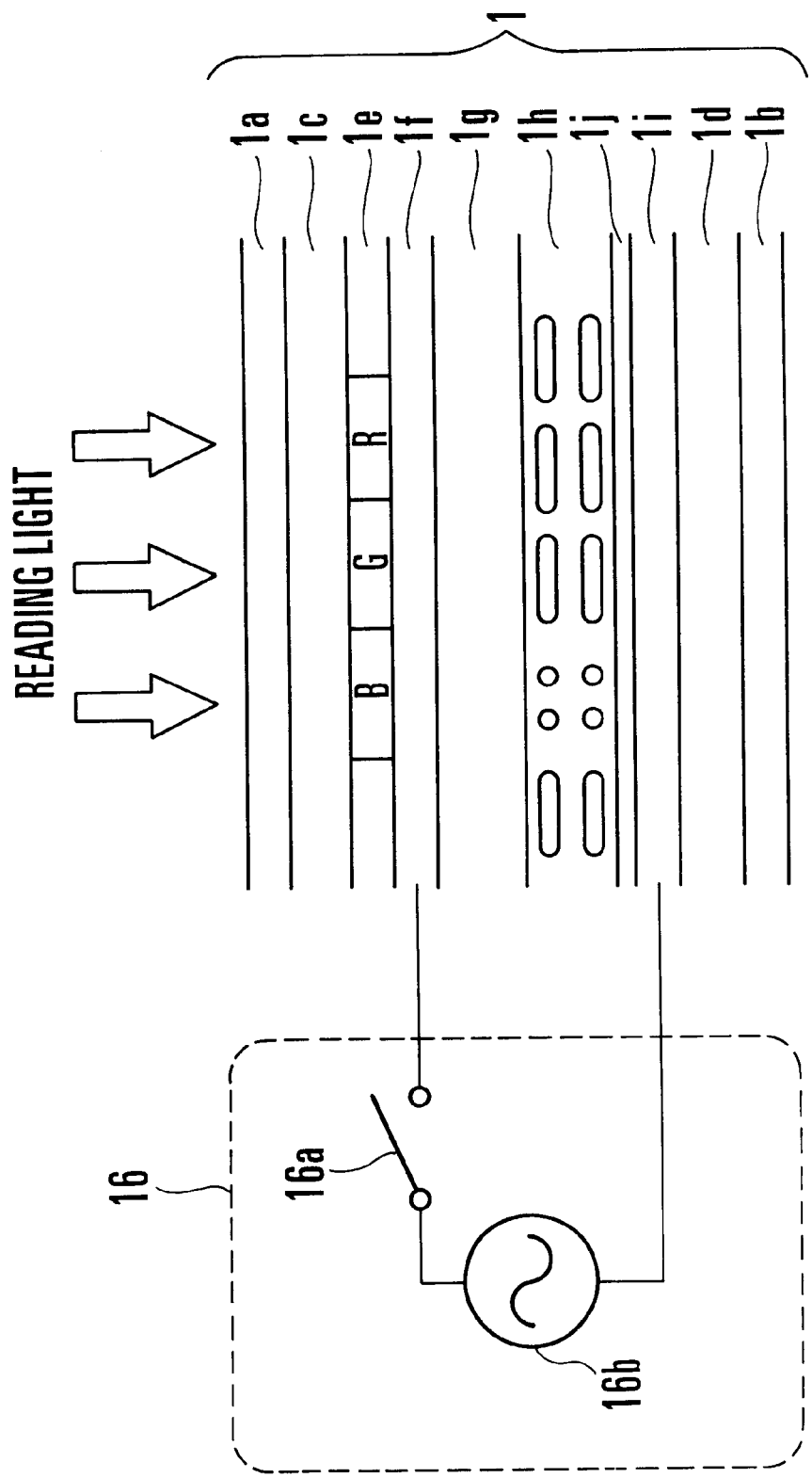
FIG. 2 is a diagrammatic cross-sectional view aiding in describing the construction and the operation principle of the spatial light modulator (SLM)

During this state, if the SLM 1 is illuminated by uniform light, which serves as reading light, in the same direction as the writing light as shown in FIG. 2, a user can view the written image on the opposite side to the light illumination surface (which side is hereinafter referred to as the viewing surface).

Incidentally, if the written image is to be erased, the reverse voltage to the voltage applied during the writing needs only to be applied across both transparent electrodes 1*f* and 1*i* with the SLM 1 being not illuminated with light.

The construction of the entire display apparatus according to the first embodiment will be described below with reference to FIGS. 3A and 3B. On the front side of the upper portion of the apparatus, the SLM 1 is disposed with the viewing surface being faced outwardly, and a protective glass 18 for protecting the SLM 1 is disposed in front of the viewing surface.

In the interior of the upper portion of the apparatus, a pair of reading light sources 2 are disposed for illuminating the SLM 1 with reading light. Each of the reading light sources 2 includes a light emission source using a cold cathode fluorescent lamp or the like, a reflector, a diffuser and the like, and is arranged to approximately uniformly illuminate the SLM 1. Incidentally, although the two reading light sources 2 are shown in FIG. 3A, the number of the reading light sources 2 may be arbitrarily selected according to the uniformity and the required brightness of illumination. A light source which has spectral characteristics to optimize the color reproduction of a read image is selected as each of the reading light sources 2.

A writing light source 3 is disposed in the interior of the lower portion of the apparatus, and includes a flash emission tube, such as a xenon tube, and a reflector. Light emitted from the writing light source 3 is transmitted through a condenser lens 4 and a diffuser 5 and approximately uniformly illuminates a film (an image recording medium) 6. When the film 6 is illuminated by the light emitted from the writing light source 3, an image recorded on the film 6 is focused and projected on the SLM 1 by a projecting lens 9 and a mirror 10. Normally, an image to be written, which is recorded on the film 6, is enlarged to a size equivalent to the size of the screen area of the SLM 1 and is projected onto the SLM 1.

Figure 3B:
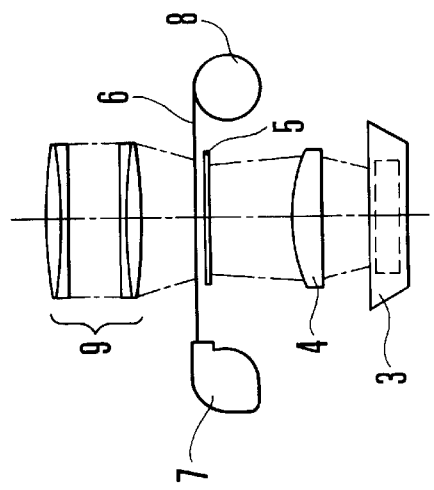
FIGS. 3A and 3B are diagrammatic layout views showing the entire layout of the image display apparatus according to the first embodiment.
Figure 3A:
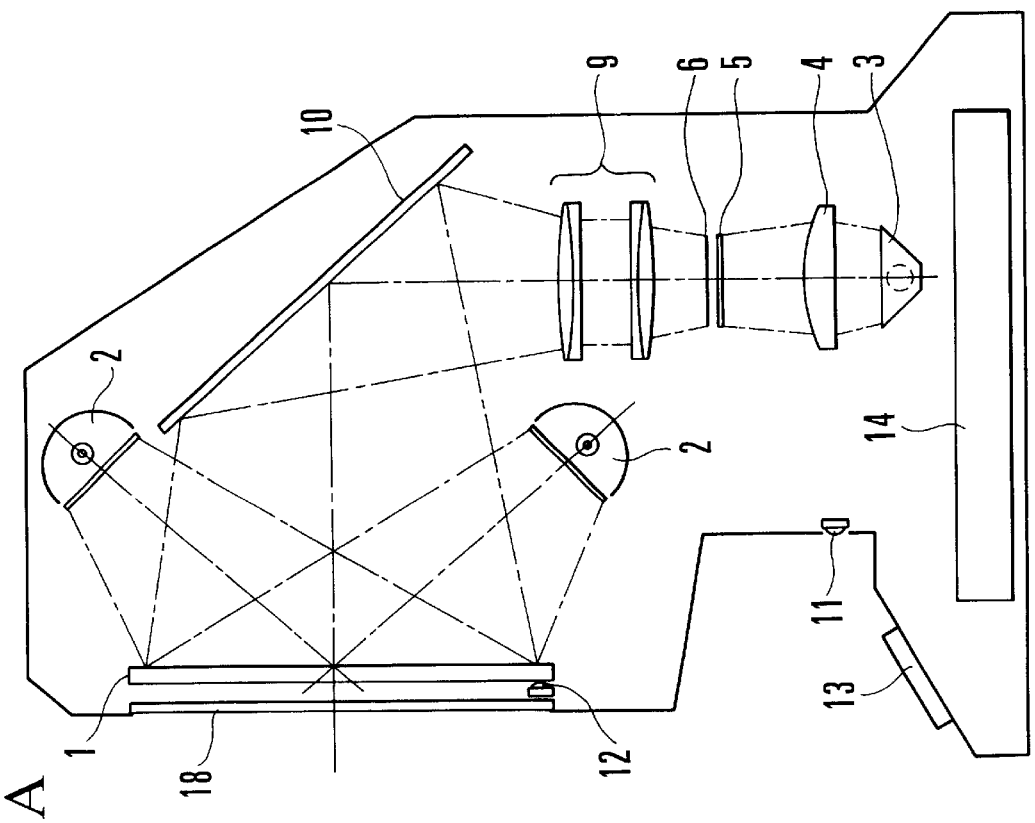

FIG. 3B is a view showing the arrangement of the constituent elements 3 to 9 as viewed in a direction perpendicular to FIG. 3A. As is apparent from FIG. 3B, the flash emission tube which constitutes part of the writing light source 3 is disposed in parallel with the longitudinal direction of the image plane of the film 6, and the film 6 is fed out of a film cartridge 7 and wound around a spool 8.

The film 6 need not necessarily be of the cartridge-accommodated type, and may also be, for example, a roll-like film or a sheet-like film.

An external-light sensor 11 is disposed on the front side of the lower portion of the apparatus. The external-light sensor 11 includes a photoelectric conversion element such as a photodiode or a phototransistor, and detects the amount of external light which illuminates the SLM 1 on the outside of the apparatus.

A density sensor 12 (which constitutes density detecting means together with control means 15 to be described later) is disposed in the vicinity of the viewing screen of the SLM 1 on the front side of the upper portion of the apparatus. The density sensor 12 includes a photoelectric conversion element such as a photodiode or a phototransistor, and, as required, other elements such as an element which integrates the output current of the photoelectric conversion element. The density sensor 12 receives part of the transmitted component of the writing light focused and projected on the SLM 1 and outputs a signal corresponding to the density, i.e., transmissivity, of the SLM 1 during writing.

For example, if the SLM 1 is of a type which reverses a written image from negative to positive, a negative film which is an original having an image to be written to the SLM 1 has an original image whose darker image portion is recorded with a higher transmissivity and whose brighter image portion is recorded with a lower transmissivity. For this reason, if the writing light source 3 is turned on to project an image to be written onto the SLM 1, a darker portion of the original image is projected onto the SLM 1 as more intense light.

Since the SLM 1 is in a highly transmissive state before the image is written to the SLM 1, the transmissivity of the SLM 1 becomes lower (the density of the SLM 1 becomes higher) in a portion illuminated by more intense light during the writing of the image. Accordingly, since the density sensor 12 is disposed so that the component of writing light that is transmitted through the SLM 1 is made incident on the density sensor 12, this arrangement makes it possible to obtain information corresponding to a variation in the density of the SLM 1 during writing, thereby making it possible to detect whether the density of the SLM 1 has reached an optimum density during image writing.

Incidentally, if the density sensor 12 uses a photoelectric conversion element such as a normal photodiode, it is preferable to dispose the density sensor 12 outside the display screen of the apparatus so as to hide the density sensor 12 from a user who is viewing the display apparatus.

An operating switch 13 is disposed on the front side of the lower portion of the apparatus. The operating switch 13 includes a display switch and a frame feed switch which will be described later, and is disposed at a position which enables the user to easily operate the operating switch 13 while viewing the screen of the SLM 1.

A circuit block 14 is disposed in the bottom portion of the interior of the apparatus.

The construction of the electrical circuit of the apparatus which includes the circuit block 14 will be described below with reference to FIG. 4. In FIG. 4, the SLM 1, the reading light source 2, the writing light sources 3, the external-light sensor 11, the density sensor 12, the operating switch 13 and the voltage applying means 16 are identical to the corresponding ones which have been described above.

Film transporting means 17 is means for winding or rewinding the film 6 by driving the rotating shaft of the film cartridge 7 or the spool 8 by means of a motor or the like.

The control means 15 is arranged to operate in accordance with software for a microcomputer or the like, and controls the voltage applying means 16, the film transporting means 17, the reading light sources 2 and the writing light source 3 in accordance with a predetermined program according to the outputs of the operating switch 13, the external-light sensor 11 and the density sensor 12. Incidentally, the control means 15 has the function of detecting the density of the SLM 1 from the output of the density sensor 12. Specifically, a density detecting function portion which is realized by the density sensor 12 and the control means 15 corresponds to density detecting means, and the function portion of the control means 15 that controls the writing light source 3 and the voltage applying means 16 corresponds to control means.

Figure 5:
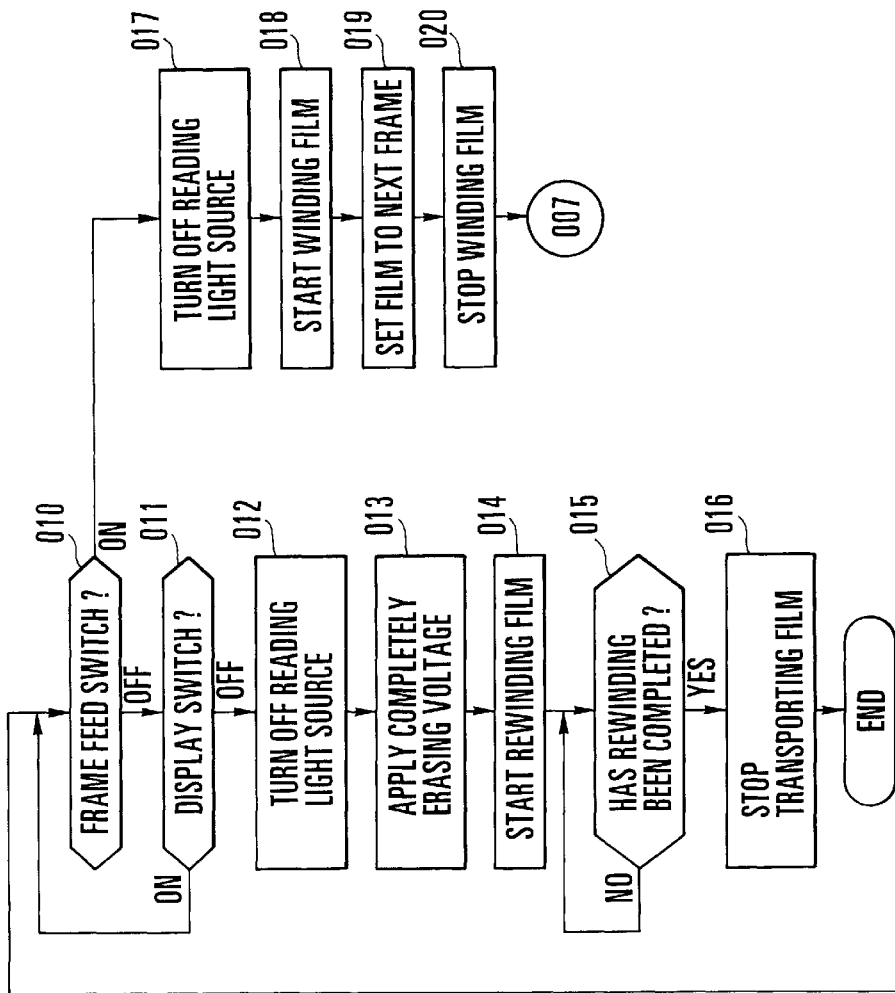
FIG. 5 is a flowchart showing the operation sequence of the image display apparatus according to the first embodiment.
Figure 6:
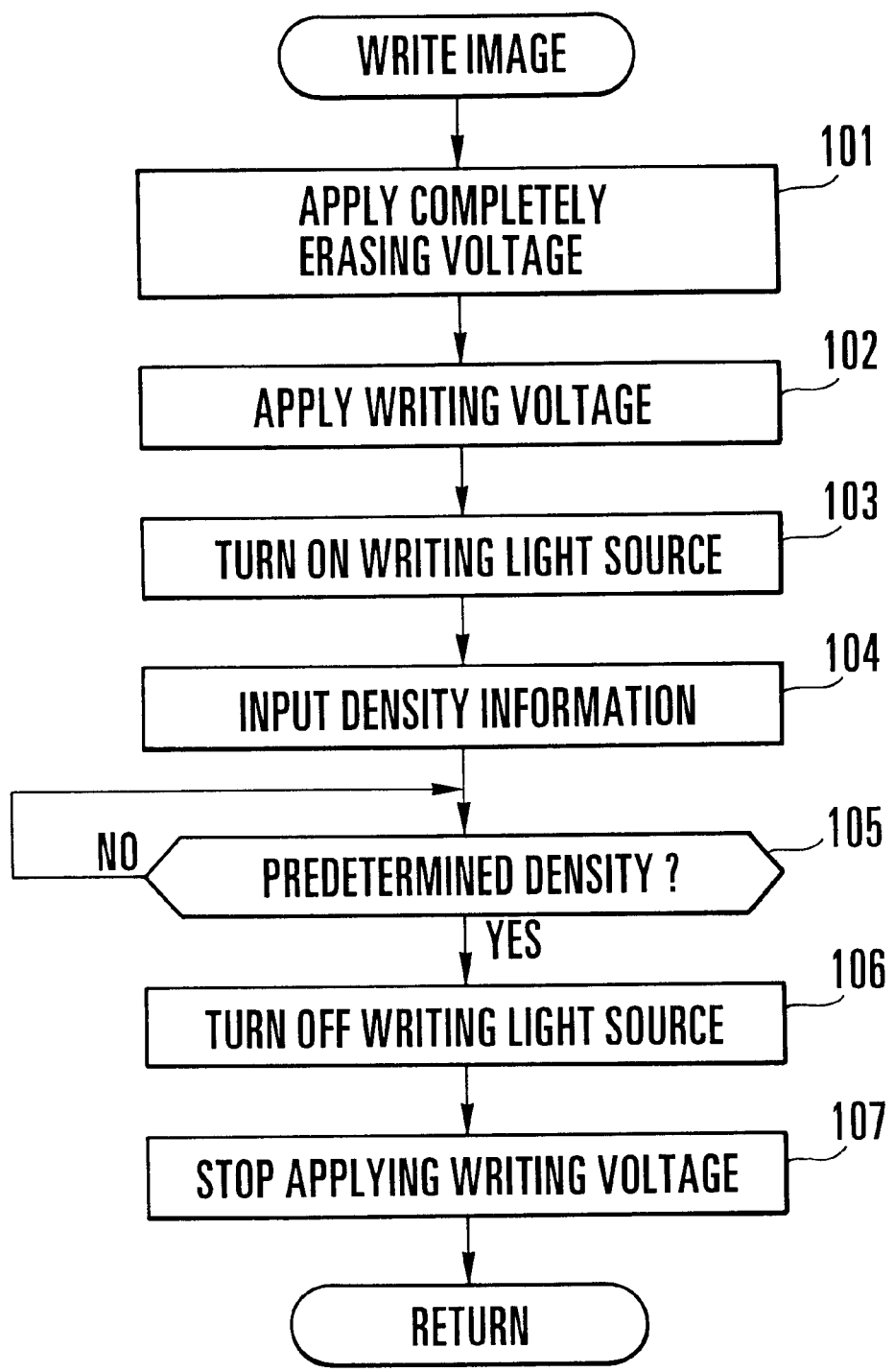
FIG. 6 is a flowchart showing the image writing sequence of the image display apparatus according to the first embodiment.

A specific operation sequence of the control means 15 will be described below with reference to the flowcharts of FIGS. 5 and 6. First, reference will be made to FIG. 5 which shows a flowchart representing the entire operation of the control means 15 from image writing to image viewing.

If a power source switch (not shown) is turned on to make the control means 15 operable, the control means 15 starts its operation in Step 001 of the flowchart. In Step 001, the control means 15 initializes the required memory, output signals and the like. In Step 001, the writing light source 3, the reading light sources 2 and the like are turned off, and the voltage applying means 16 does not apply voltage to the SLM 1.

In Step 002, the process waits for the film cartridge 7 to be loaded into the apparatus. If the film cartridge 7 is loaded, the process proceeds to Step 003. In Step 003, the control means 15 outputs a signal to the film transporting means 17 to cause it to start feeding the film 6 out of the film cartridge 7.

Then, in Step 004, the photographic picture of the first frame of the film 6 is set to a writing position (a position to be illuminated by the writing light source 3), and the process proceeds to Step 005, in which the control means 15 stops outputting the signal to the film transporting means 17 to bring film feeding to an end.

Then, in Step 006, the process waits for the display switch included in the operating switch 13 to be turned on. If the display switch is turned on, the process proceeds to Step 007.

In Step 007, the control means 15 executes a sequence for writing an image on the film 6 to the SLM 1. This image writing sequence will be described later with reference to the flowchart shown in FIG. 6.

After the image writing sequence has been completed, the process proceeds to Step 008, in which the control means 15 reads the output of the external-light sensor 11 to obtain information indicative of the amount of external light. Then, in Step 009, the control means 15 turns on the reading light sources 2 to cause it to provide an optimum brightness, on the basis of the information indicative of the amount of external light. Thus, the image written to the SLM 1 becomes visible.

After the image has become visible, the process proceeds to Step 010, in which the control means 15 determines whether the frame feed switch included in the operating switch 13 has been turned on. If the frame feed switch is off, the process proceeds to Step 011.

In Step 011, the control means 15 determines whether the display switch included in the operating switch 13 has been turned on. If the display switch is continuously on, the process returns to Step 010, and repeats Steps 010 and 011 for checking the states of the respective switches. If the display switch is off, the process proceeds to Step 012.

In Step 012, the control means 15 turns off the reading light sources 2. Thus, the image written to the SLM 1 becomes invisible. Then, in Step 013, the control means 15 outputs a control signal to the voltage applying means 16 so that a voltage of opposite polarity to the voltage applied during the image writing is applied to each of the electrodes 1f and 1i of the SLM 1. Thus, the image written to the SLM 1 is erased.

Then, in Step 014, the control means 15 outputs a signal to the film transporting means 17 to cause it to start rewinding the film 6. In Step 015, the process waits until the film 6 is completely rewound into the film cartridge 7 and the film rewinding is completed. When the rewinding of the film 6 is completed, the process proceeds to Step 016.

In Step 016, the control means 15 stops outputting the signal to the film transporting means 17 and brings the film rewinding to an end. The process is brought to an end, and the control means 15 waits until the next operation starts in Step 001.

On the other hand, if the control means 15 determines in Step 010 that the frame feed switch has been turned on, the process proceeds to Step 017, in which the control means 15 turns off the reading light sources 2. Thus, the image written to the SLM 1 becomes invisible. Then, the process proceeds to Step 018, in which the control means 15 outputs a signal to the film transporting means 17 to cause it to start winding the film 6. In Step 019, the photographic picture of the next frame of the film 6 is set to the writing position. The process proceeds to Step 020, in which the control means 15 stops outputting the signal to the film transporting means 17 to bring the film winding to an end.

After the completion of Step 020, the process returns to Step 007, in which the control means 15 writes the image to the SLM 1. Then, in Step 009, the control means 15 turns on the reading light sources 2 so that the next image becomes visible.

The image writing sequence executed in Step 007 will be described below with reference to the flowchart of FIG. 6. In Step 101, since an image which may occasionally be already written to the SLM 1 needs to be erased, the control means 15 outputs a control signal to the voltage applying means 16 so that a voltage of opposite polarity to the voltage applied during the image writing is applied to each of the transparent electrodes 1f and 1i of the SLM 1. Thus, the image written to the SLM 1 is erased.

Then, in Step 102, the control means 15 outputs a control signal to the voltage applying means 16 to cause it to apply a predetermined voltage across the transparent electrodes 1f and 1i of the SLM 1. Then, in Step 103, the control means 15 turns on the writing light source 3 to cause it to start projecting an image from the film 6 onto the SLM 1, thereby starting writing the image to the SLM 1.

Then, in Step 104, the control means 15 reads the output of the density sensor 12, i.e., starts detecting the density of the SLM 1. Then, in Step 105, the process waits for the detected density of the SLM 1 to reach a predetermined optimum density. If it is determined that the density of the SLM 1 has reached the optimum density during the writing of the image, the process proceeds to Step 106.

In Step 106, the control means 15 turns off the writing light source 3. Then, in Step 107, the control means 15 stops outputting the control signal to the voltage applying means 16, and stops the application of the writing voltage across the transparent electrodes 1f and 1i of the SLM 1. Thus, the writing of the image to the SLM 1 is brought to an end.

According to the above-described first embodiment, when the density of the SLM 1 reaches an optimum density after the writing of a film image to the SLM 1 has been started, the writing of the image is brought to an end, so that a user can view a good image at any time irrespective of a variation in the sensitivity of the SLM 1 or the like.

Second Embodiment

Figure 7:
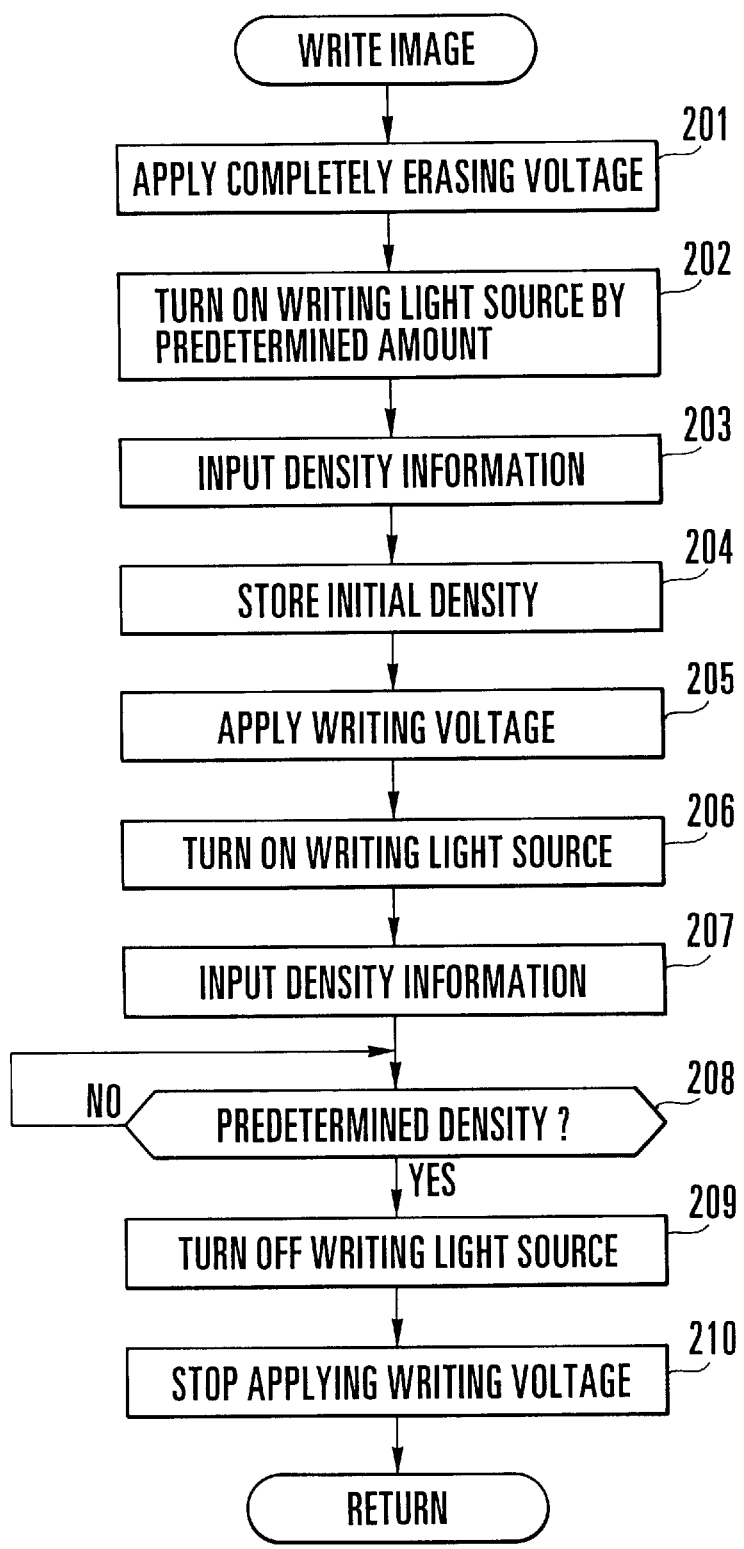
FIG. 7 is a flowchart showing the image writing sequence of an image display apparatus according to a second embodiment of the present invention.

The above-described image writing sequence of the first embodiment suffices if a variation in the density of the SLM 1 before the writing of an image to the SLM 1, a variation in the intensity of writing light or a variation in the output of the density sensor 12 is comparatively small and stable. Otherwise, it is desirable to carry out the image writing sequence shown in FIG. 7.

In this image writing sequence, in Step 201, since an image which may occasionally be already written to the SLM 1 needs to be erased, the control means 15 outputs a control signal to the voltage applying means 16 so that a voltage of opposite polarity to the voltage applied during the image writing is applied to each of the transparent electrodes 1f and 1i of the SLM 1. Thus, the image written to the SLIM 1 is erased.

Then, in Step 202, the control means 15 turns on the writing light source 3 for a predetermined period of time or until a predetermined amount of light is emitted, without causing the voltage applying means 16 to apply writing voltage to either of the transparent electrodes 1f and 1i (preliminary illumination). In Step 202, since no writing voltage is applied to the SLM 1, the writing of an image is not yet performed.

In Step 203, the control means 15 reads the output of the density sensor 12 relative to the writing light which has been made to illuminate the SLM 1 in Step 202. Then, in Step 204, the control means 15 stores a detected density relative to the read output of the density sensor 12, as initial density information relative to the SLM 1 before the writing of the image.

Then, in Step 205, the control means 15 outputs a control signal to the voltage applying means 16 to cause it to apply a predetermined voltage across the transparent electrodes 1f and 1i of the SLM 1. Then, in Step 206, the control means 15 turns on the writing light source 3 (main illumination) to cause it to start projecting an image from the film 6 onto the SLM 1, thereby starting writing the image to the SLM 1.

Then, in Step 207, the control means 15 reads the output of the density sensor 12, i.e., starts detecting the density of the SLM 1. Then, in Step 208, the process waits for the detected density of the SLM 1 to reach a predetermined optimum density corresponding to the initial density stored in Step 204, while comparing the detected density with the initial density. If it is determined that the detected density has reached the optimum density, the process proceeds to Step 209.

In Step 209, the control means 15 turns off the writing light source 3. Then, in Step 210, the control means 15 stops outputting the control signal to the voltage applying means 16, and stops the application of the writing voltage across the transparent electrodes 1f and 1i of the SLM 1. Thus, the writing of the image to the SLM 1 is brought to an end.

According to the above-described second embodiment, when the density of the SLM 1, which varies according to the writing of an image to the SLM 1 with respect to the detected density (initial density) of the SLM 1 during the preliminary illumination of the SLM 1 with writing light before the writing of the image, reaches a density optimum for viewing, the writing of the image to the SLM 1 is brought to an end, so that a user can view a good image at any time irrespective of a density in the density of the SLM 1 before the writing of the image to the SLM 1, a variation in the intensity of the writing light, a variation in the output of the density sensor 12 or the like.

Third Embodiment

Figure 8:
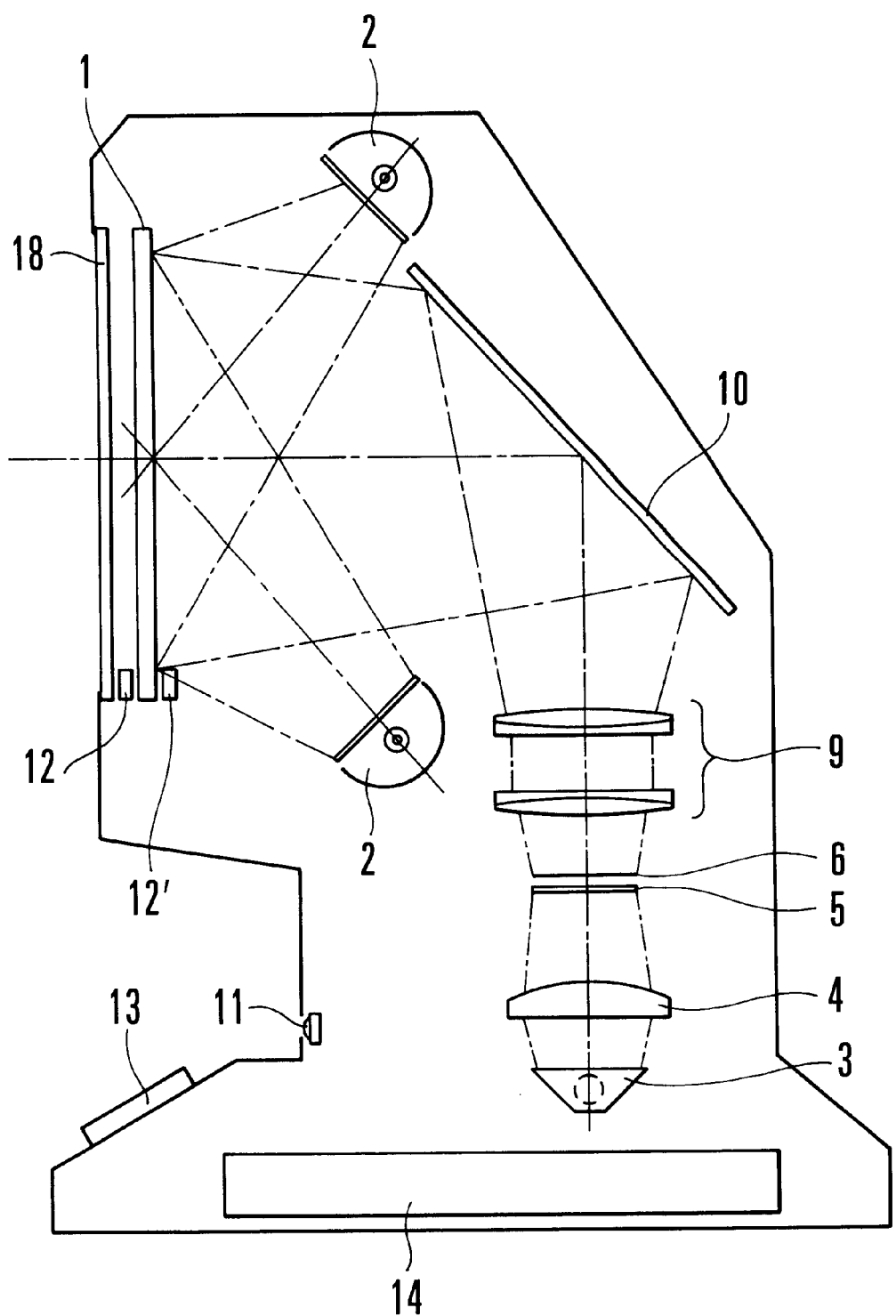
FIG. 8 is a diagrammatic cross-sectional view showing the entire layout of an image display apparatus according to a third embodiment of the present invention.
Figure 9:
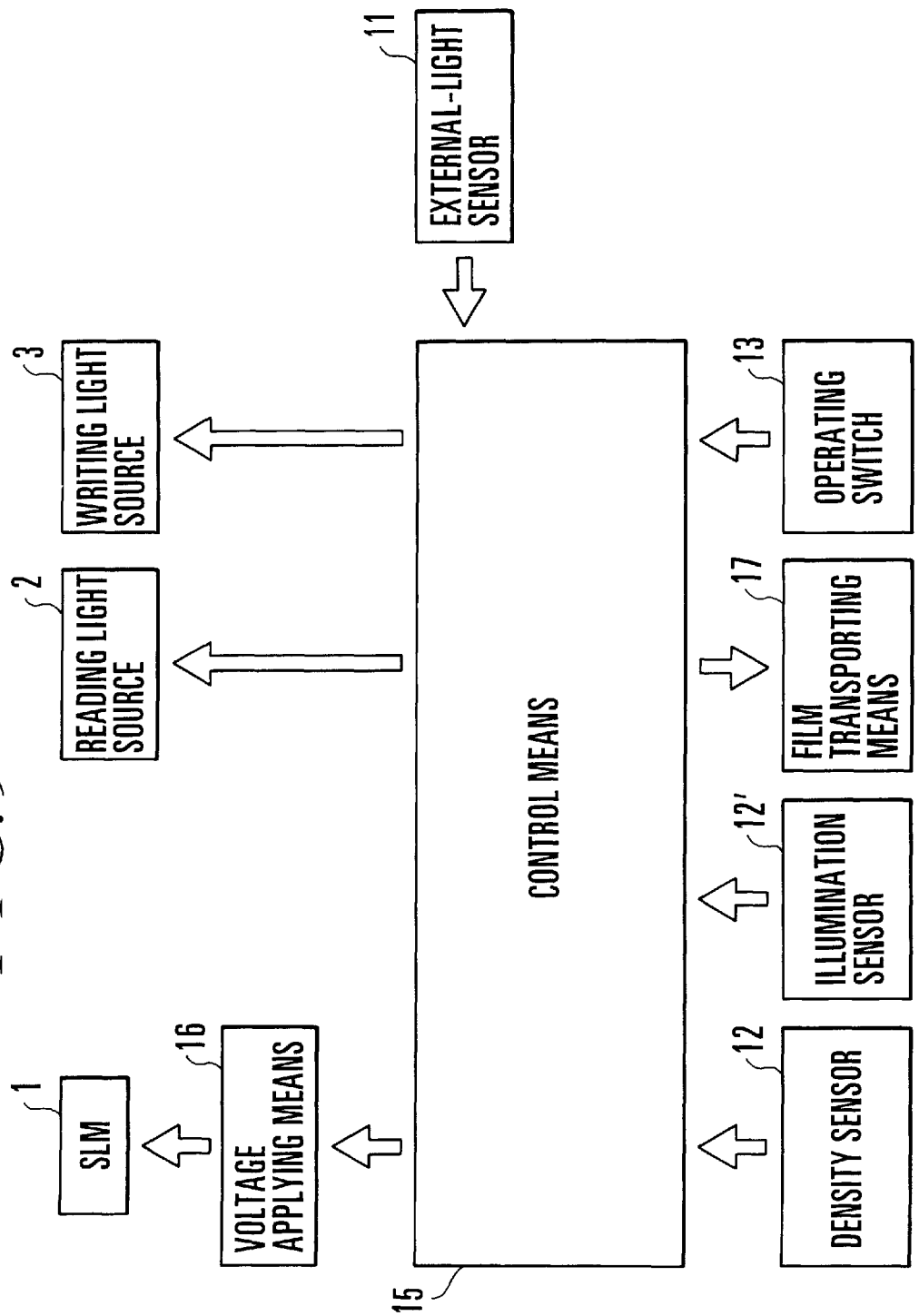
FIG. 9 is a block diagram showing the electrical circuit construction of the image display apparatus according to the third embodiment.
Figure 10:
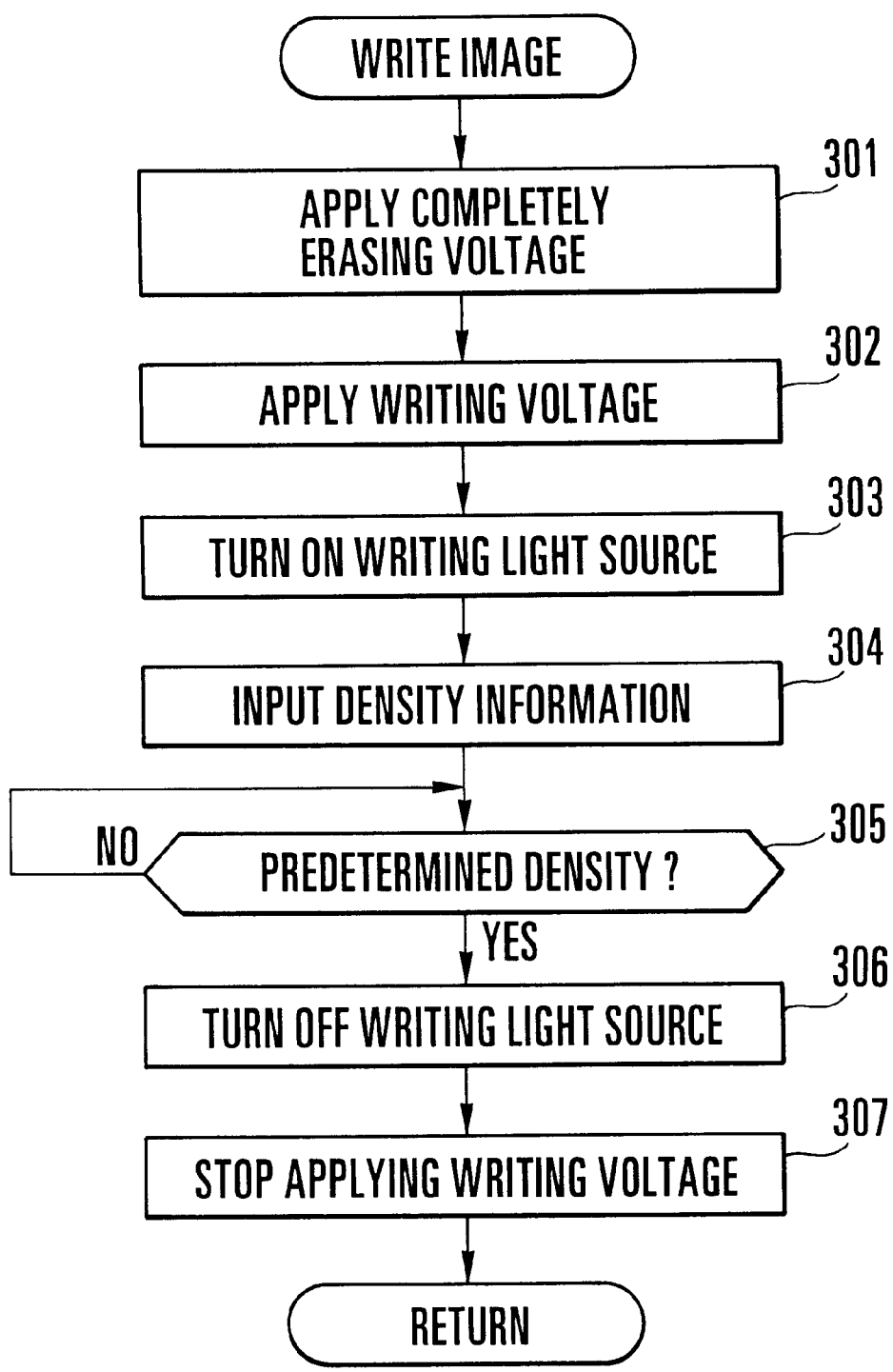
FIG. 10 is a flowchart showing the image writing sequence of the image display apparatus according to the third embodiment.

Although, in the description of the first embodiment, reference has been made to the case in which the density of the SLM 1 during image writing is detected from the component of writing light that is transmitted through the SLM 1, a third embodiment which will be described below with reference to FIGS. 8 to 10 is intended for a method of more accurately detecting density during image writing. Incidentally, the basic construction of the apparatus shown in FIGS. 8 and 9 is identical to that of the first embodiment, and identical reference numerals are used to denote common constituent elements for the sake of simplicity in description.

The third embodiment differs from the first embodiment in that an illumination sensor 12' which provides an output according to the component of writing light which has been made to illuminate the SLM 1 is disposed on the side of the light illumination surface of the SLM 1, in addition to the density sensor 12 disposed on the side of the viewing surface of the SLM 1. In this case, the density sensor 12 and the illumination sensor 12' constitute density detecting means together with the density detecting function portion of the control means 15.

In the third embodiment, the control means 15 executes the image writing sequence shown in FIG. 10 in the form of a flowchart.

In Step 301, since an image which may occasionally be already written to the SLM 1 needs to be erased, the control means 15 outputs a control signal to the voltage applying means 16 so that a voltage of opposite polarity to the voltage applied during image writing is applied to each of the transparent electrodes 1$f$ and 1$i$ of the SLM 1. Thus, the image written to the SLM 1 is erased.

Then, in Step 302, the control means 15 outputs a control signal to the voltage applying means 16 to cause it to apply a predetermined writing voltage across the transparent electrodes 1$f$ and 1$i$ of the SLM 1. Then, in Step 303, the control means 15 turns on the writing light source 3 to cause it to start projecting an image from the film 6 onto the SLM 1, thereby starting writing the image to the SLM 1.

Then, in Step 304, the control means 15 starts reading the outputs of the density sensor 12 and the illumination sensor 12'. Then, in Step 305, the control means 15 obtains, as a detected density of the SLM 1, information corresponding to the difference between the output values of both sensors 12 and 12', and the process waits for the detected density of the SLM 1 during the writing of the image to reach a predetermined optimum density. If it is determined that the detected density has reached the optimum density, the process proceeds to Step 306.

In Step 306, the control means 15 turns off the writing light source 3. Then, in Step 307, the control means 15 stops outputting the control signal to the voltage applying means 16, and stops the application of the writing voltage across the transparent electrodes 1$f$ and 1$i$ of the SLM 1. Thus, the writing of the image to the SLM 1 is brought to an end.

According to the above-described third embodiment, it is possible to more accurately detect the ratio of the amount of light which illuminates the SLM 1 from the writing light source 3 to the amount of light which is transmitted through the SLM 1, i.e., transmissivity (density), so that a user can view a good image compared to the first embodiment.

Fourth Embodiment

Figure 11:
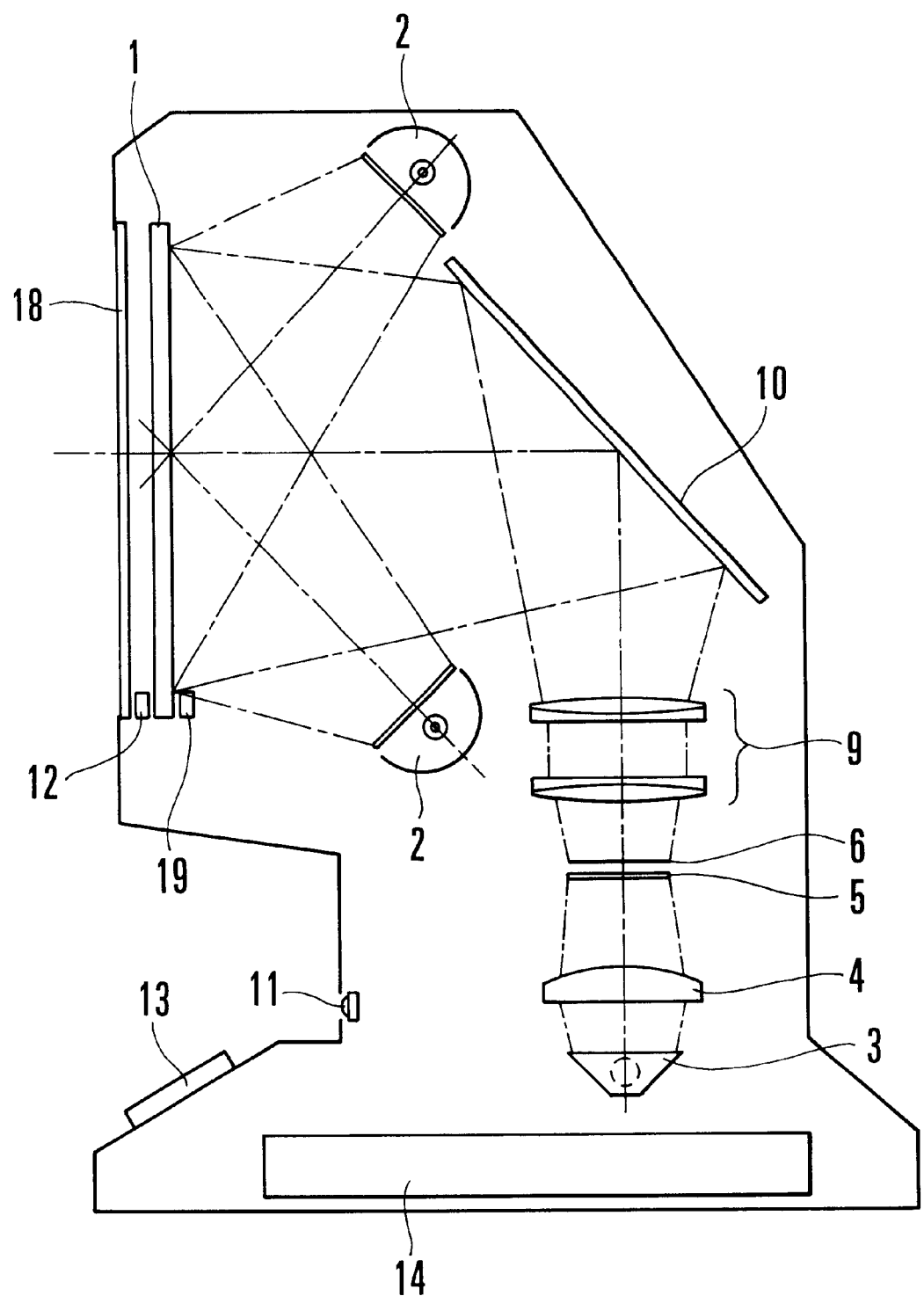
FIG. 11 is a diagrammatic cross-sectional view showing the entire layout of an image display apparatus according to a fourth embodiment of the present invention.
Figure 12:
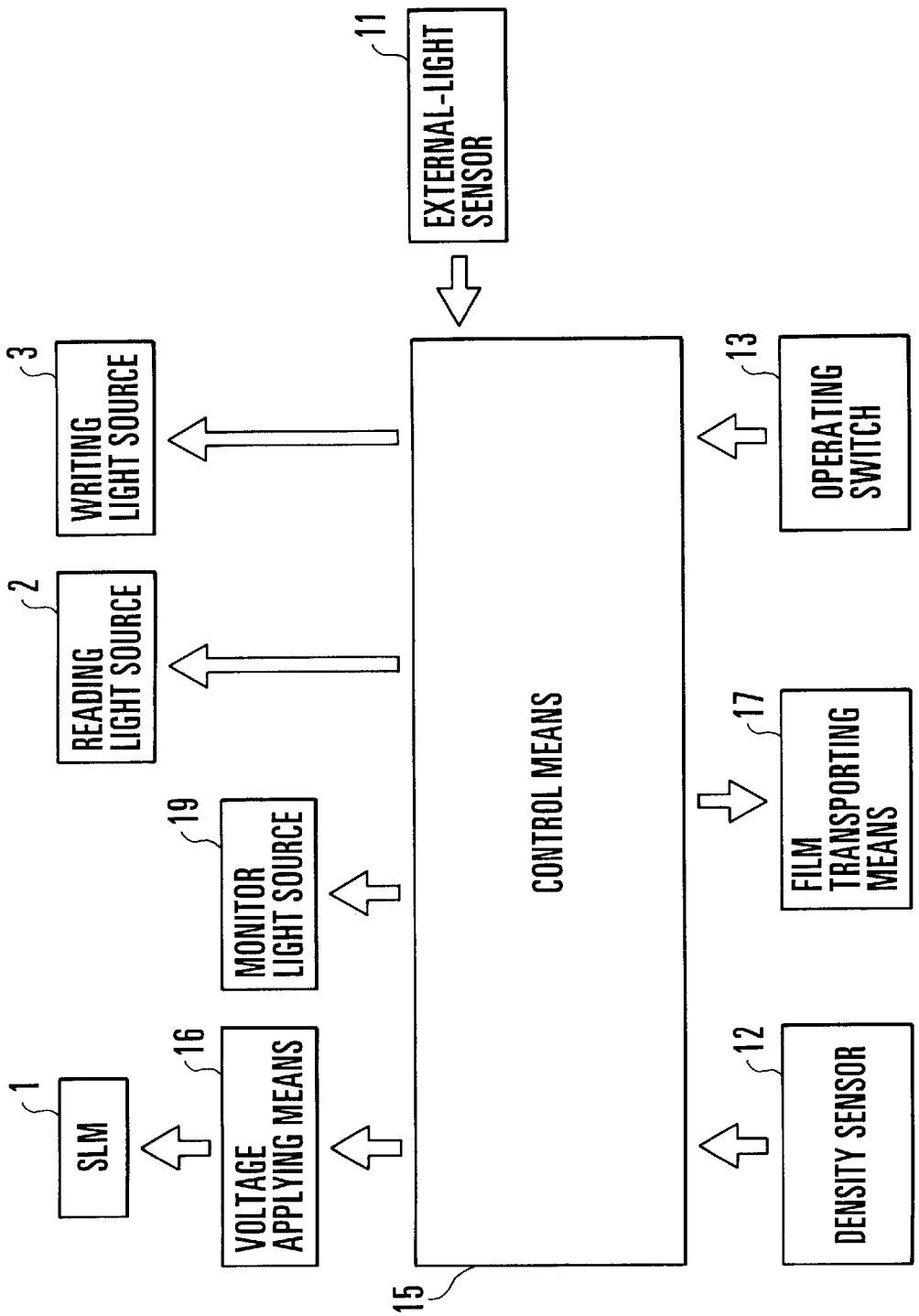
FIG. 12 is a block diagram showing the electrical circuit construction of the image display apparatus according to the fourth embodiment.

If writing light is an instantaneous flash emission, detection of the density of the SLM 1 or control of image writing to the SLM 1 may not be able to be accurately performed owing to problems such as the response delay of the density sensor 12 and the operation delay of the control means 15. In this case, it is desirable to adopt the apparatus construction shown in FIGS. 11 and 12. Incidentally, the construction of the apparatus shown in FIGS. 11 and 12 is basically identical to that of the first embodiment, and identical reference numerals are used to denote constituent elements common to those of the first embodiment for the sake of simplicity in description.

The fourth embodiment differs from the first embodiment in that a monitor light source 19 which makes light incident on the density sensor 12 is disposed on the side of the light illumination surface of the SLM 1 in addition to the writing light source 3. As the monitor light source 19, it is desirable to use an element which is stable in the amount of light emission, such as an LED or a lamp.

In the fourth embodiment, the density sensor 12 provides an output which corresponds to the component of light emitted from the monitor light source 19 that is transmitted through the SLM 1, and the control means 15 obtains density information relative to the SLM 1 which corresponds to the output of the density sensor 12.

Figure 13:
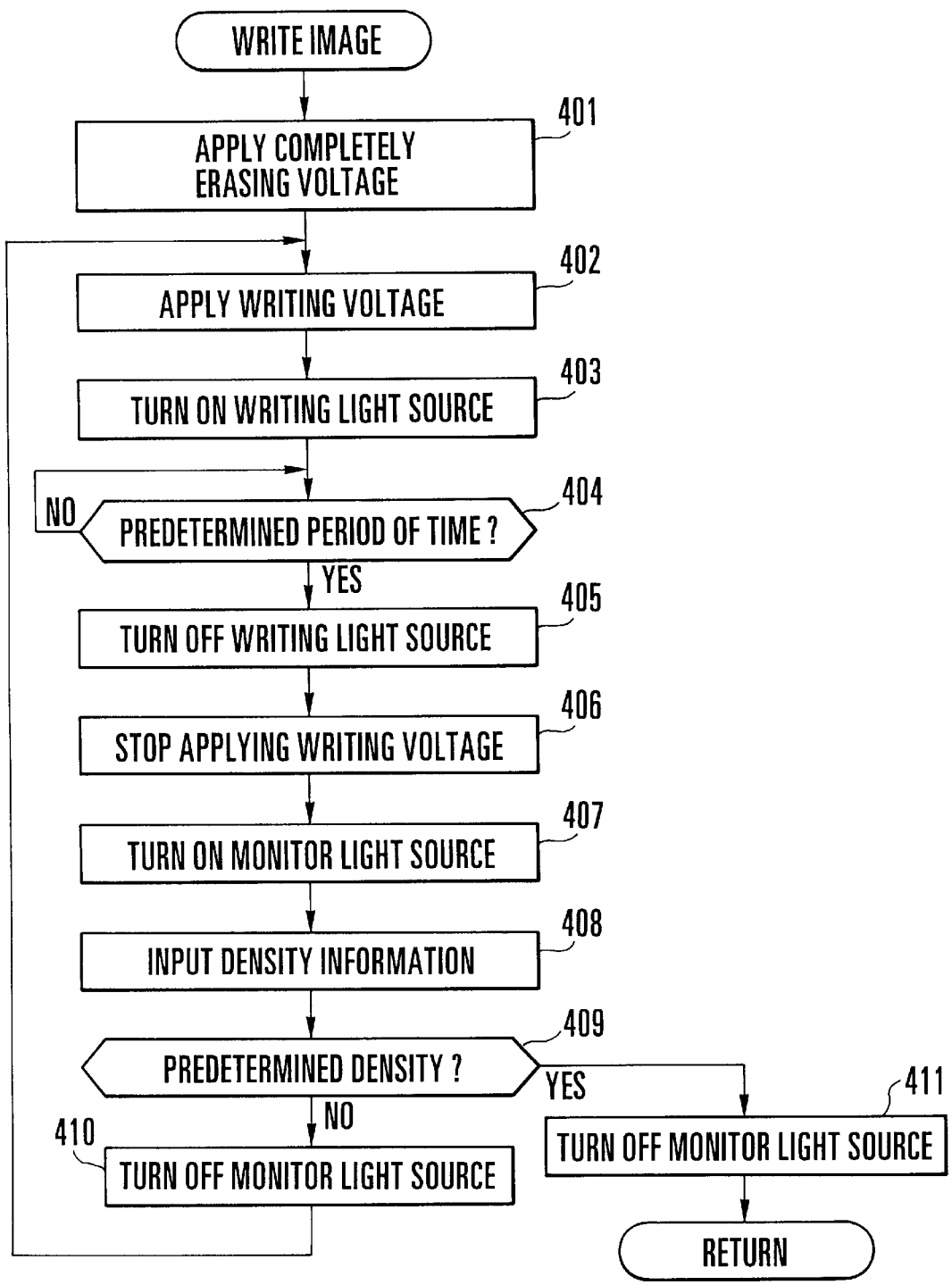
FIG. 13 is a flowchart showing the image writing sequence of the image display apparatus according to the fourth embodiment.

In the fourth embodiment, the control means 15 executes the image writing sequence shown in FIG. 13 in the form of a flowchart.

In Step 401, since an image which may occasionally be already written to the SLM 1 needs to be erased, the control means 15 outputs a control signal to the voltage applying means 16 so that a voltage of opposite polarity to the voltage applied during image writing is applied to each of the transparent electrodes 1$f$ and 1$i$ of the SLM 1. Thus, the image written to the SLM 1 is erased.

Then, in Step 402, the control means 15 outputs a control signal to the voltage applying means 16 to cause it to apply a predetermined writing voltage across the transparent electrodes 1$f$ and 1$i$ of the SLM 1. Then, in Step 403, the control means 15 turns on the writing light source 3 to cause it to start projecting an image from the film 6 onto the SLM 1, thereby starting writing the image to the SLM 1.

Then, in Step 404, the control means 15 waits until the period of time for which the writing light source 3 is on reaches a predetermined period of time. This step may also be arranged so that the control means 15 waits until the amount of light emitted from the writing light source 3 reaches a predetermined amount. If the writing light source 3 emits light for the predetermined period of time or by the predetermined amount of light, the process proceeds to Step 405, in which the writing light source 3 is turned off.

In Step 406, the control means 15 stops outputting the control signal to the voltage applying means 16, and stops the application of the writing voltage across the transparent electrodes 1$f$ and 1$i$ of the SLM 1. Thus, the writing of the image to the SLM 1 is temporarily brought to an end.

Then, in Step 407, the control means 15 turns on the monitor light source 19. Then, in Step 408, the control means 15 reads the output of the density sensor 12 and obtains density information relative to the SLM 1. Then, in Step 409, the control means 15 determines whether the obtained density of the SLM 1 has reached a predetermined optimum density. If it is not determined that the obtained density has reached the optimum density, the process proceeds to Step 410, in which the control means 15 turns off the monitor light source 19.

After that, the process returns to Step 402, in which image writing based on the aforesaid predetermined period of time or predetermined amount of light is repeated. The density of the SLM 1 is adjusted to a non-excessively high density for each image writing operation based on the predetermined period of time or the predetermined amount of light which has been referred to in the description of Step 404, and such image writing is repeated a plurality of times until it is determined in Step 409 that the density of the SLM 1 has reached the predetermined optimum density. Then, the process proceeds from Step 409 to Step 411, in which the control means 15 turns off the monitor light source 19.

According to the above-described fourth embodiment, even if writing light is an instantaneous flash emission, the detection of the density of the SLM 1 by the density sensor 12 and the operation of the control means 15 are performed on the basis of monitoring light emitted toward the density sensor 12 and the SLM 1 for a sufficient period of time, whereby it is possible to accurately perform detection of the density of the SLM 1 and writing control of the SLM 1.

Fifth Embodiment

Although in each of the above-described embodiments the density sensor 12 is disposed between the SLM 1 and the protective glass 18 as a constituent element separate from both of them, a photoelectric conversion element using amorphous silicon or the like may also be used as a density sensor, and such density sensor can be disposed in the interior of the SLM 1 or on the protective glass 18.

FIG. 14 schematically shows a case in which photodiodes (density sensors) 12a to 12i using amorphous silicon are formed on a glass (glass substrate) 1d' of the SLM 1. In FIG. 14, reference numerals 21 and 22 denote common electrodes for leading the anode or cathode of each of the photodiodes 12a to 12i to the outside, and reference numerals 23 and 24 denote transparent electrodes for connecting the anode or cathode of each of the photodiodes 12a to 12i to the common electrodes 21 and 22.

Photodiodes using amorphous silicon can be formed on the glass 1d' or the protective glass 18, and can also be formed with a thickness of approximately 10 μm or less which allows transmission of light. In addition, each individual photodiode can be formed to have a square shape each side of which is several tens of μm long. Accordingly, even if such sensors are disposed in a viewing screen such as a surface of the glass 1d' of the SLM 1, a surface of the protective glass 18 or a surface of another glass, this arrangement does not hinder a user from viewing an image.

Furthermore, the layout or the number of such sensors within the viewing screen is not limited to the arrangement shown in FIG. 14, and can be freely determined within the range of limitation of the wiring pattern of the transparent electrodes. Accordingly, for example, the layout density of the sensors is made comparatively higher in the central portion of the screen and comparatively lower in the marginal portion thereof so that the detection of the density of the SLM 1 can be weighted within the screen. In addition, since it is possible to make the distance between the SLM 1 and the protective glass 18 small compared to the case of each of the first to fourth embodiments which is provided with the density sensor 12, the fifth embodiment is effective in making the apparatus more compact.

Although the above description of each of the first to fifth embodiments has referred to the case in which a liquid crystal type of SLM is used as storage display means, the present invention can also be applied to an image display apparatus which uses a spatial light modulator of a type other than the liquid crystal type, for example, a spatial light modulator using BSO or other storage display means.

Although the above description of each of the first to fifth embodiments has referred to the case in which an image recorded on film is displayed, the present invention can also be applied to an apparatus which displays an image recorded on an image recording medium other than film.

As is apparent from the foregoing description, in accordance with each of the above-described embodiments, the writing of an image to the storage display means is brought to an end when the detection density of the storage display means (i.e., the density of a stored image) reaches a predetermined density after the image writing is started. Accordingly, it is possible to realize an image display apparatus which can perform optimum image writing at any time irrespective of a variation in the sensitivity of the storage display means, thereby enabling a user to view a good image.

Incidentally, it is also possible to realize an image display apparatus which can detect a more accurate density of a stored image and enable a user to view a far better image, by adopting an arrangement which detects the density of the storage display means from the difference between the component of writing light that illuminates the storage display means and the component of writing light that is transmitted through the storage display means, or by adopting an arrangement which brings image writing to an end when a density detected during main illumination of writing light reaches a predetermined density relative to a density detected during preliminary illumination.

In addition, if the apparatus is arranged to detect the density of the storage display means by using monitoring light which is made to illuminate the storage display means separately from writing light, it is possible to realize an image display apparatus which enables a user to view a good image, without any problem such as a response delay or the like of the density detecting means even if writing light is a flash emission.

In addition, in an arrangement which has a glass substrate in a display optical path which includes the storage display means, if density detecting means made of amorphous silicon is formed on a glass substrate so that the thickness of the density detecting means is small enough to realize optical transmissivity, it is possible to provide a plurality of density display means in the apparatus without the need to increase the size of the apparatus or without the risk of hindering a user from viewing an image, and it is also possible to perform weighting or the like on density detection within the screen of the storage display means.

What is claimed is:

1. An image display apparatus having a storage display device which stores an image written by writing light representative of the image and displays the stored image, comprising:
   density detecting means for detecting a density of said storage display device; and
   control means which brings image writing to an end when the density detected by said density detecting means reaches a predetermined density after the image writing to said storage display device is started.

2. An apparatus according to claim 1, wherein said control means stops illumination of said storage display device with the writing light when the density detected by said density detecting means reaches the predetermined density.

3. An apparatus according to claim 1, wherein the image writing to said storage display device is possible only with a voltage for storage operation being applied to said storage display device, said control means stopping application of the voltage for storage operation to said storage display device when the density detected by said density detecting means reaches the predetermined density after the image writing to said storage display device is started.

4. An apparatus according to claim 1, wherein said density detecting means detects the density of said storage display device from a component of the writing light which component is transmitted through said storage display device.

5. An apparatus according to claim 1, wherein said density detecting means detects the density of said storage display device from a difference between a component of the writing light which component is made to illuminate said storage display device and a component of the writing light which component is transmitted through said storage display device.

6. An apparatus according to claim 1, wherein said apparatus is capable of performing preliminary illumination for illuminating said storage display device with the writing light before a storage operation of said storage display device, and main illumination for illuminating said storage display device with the writing light during the storage operation of said storage display device, said control means bringing the image writing to said storage display device to an end when a density detected by said density detecting means during the main illumination reaches a predetermined density relative to a density detected by said density detecting means during the preliminary illumination.

7. An apparatus according to claim 1, wherein said density detecting means detects the density of said storage display device by using monitoring light which is made to illuminate said storage display device after illumination of said storage display device with the writing light.

8. An apparatus according to claim 7, wherein the illumination of said storage display device with the writing light and density detection using the monitoring light by said density detecting means are alternately repeated until the density detected by said density detecting means reaches the predetermined density.

9. An apparatus according to claim 1, wherein said storage display device is a spatial light modulator.

10. An apparatus according to claim 1, wherein said density detecting means has optical transmissivity and is formed on a glass substrate in an image display optical path which includes said storage display device.

11. An apparatus according to claim 10, wherein said density detecting means is formed of amorphous silicon.

12. An apparatus according to claim 11, wherein said density detecting means is formed at a plurality of locations on the glass substrate.

13. An apparatus according to claim 2, wherein the image writing to said storage display device is possible only with a voltage for storage operation being applied to said storage display device, said control means stopping application of the voltage for storage operation to said storage display device when the density detected by said density detecting means reaches the predetermined density after the image writing to said storage display device is started.

14. An apparatus according to claim 3, wherein said density detecting means detects the density of said storage display device from a component of the writing light which component is transmitted through said storage display device.

15. An apparatus according to claim 2, wherein said density detecting means detects the density of said storage display device from a difference between a component of the writing light which component is made to illuminate said storage display device and a component of the writing light which component is transmitted through said storage display device.

16. An apparatus according to claim 3, wherein said density detecting means detects the density of said storage display device from a difference between a component of the writing light which component is made to illuminate said storage display device and a component of the writing light which component is transmitted through said storage display device.

17. An apparatus according to claim 2, wherein said density detecting means detects the density of said storage display device by using monitoring light which is made to illuminate said storage display device after illumination of said storage display device with the writing light.

18. An apparatus according to claim 3, wherein said density detecting means detects the density of said storage display device by using monitoring light which is made to illuminate said storage display device after illumination of said storage display device with the writing light.

* * * * *

UNITED STATES PATENT AND TRADEMARK OFFICE
CERTIFICATE OF CORRECTION

PATENT NO. : 6,309,075 B1  
DATED : October 30, 2001  
INVENTOR(S) : Toshifumi Ohsawa It is certified that error appears in the above-identified patent and that said Letters Patent is hereby corrected as shown below:

Column 7,
Line 66, "SLIM" should read -- SLM --.

Signed and Sealed this

Second Day of April, 2002

*Attest:*

JAMES E. ROGAN
*Attesting Officer*     *Director of the United States Patent and Trademark Office*